United States Patent
Kobayashi et al.

(10) Patent No.: US 10,352,426 B2
(45) Date of Patent: Jul. 16, 2019

(54) FLAT STRAIN WAVE GEARING

(71) Applicant: Harmonic Drive Systems Inc., Tokyo (JP)

(72) Inventors: Masaru Kobayashi, Azumino (JP); Tatsuro Hoshina, Azumino (JP)

(73) Assignee: Harmonic Drive Systems Inc., Shinagawa-ku, Tokyo (JP)

( * ) Notice: Subject to any disclaimer, the term of this patent is extended or adjusted under 35 U.S.C. 154(b) by 413 days.

(21) Appl. No.: 15/033,815

(22) PCT Filed: May 29, 2015

(86) PCT No.: PCT/JP2015/065630
§ 371 (c)(1),
(2) Date: May 2, 2016

(87) PCT Pub. No.: WO2016/194066
PCT Pub. Date: Dec. 8, 2016

(65) Prior Publication Data
US 2017/0009868 A1 Jan. 12, 2017

(51) Int. Cl.
*F16H 49/00* (2006.01)
*F16H 55/08* (2006.01)
(Continued)

(52) U.S. Cl.
CPC ........... *F16H 49/001* (2013.01); *F16B 21/18* (2013.01); *F16H 55/0833* (2013.01);
(Continued)

(58) Field of Classification Search
CPC ..... F16H 1/10; F16H 1/24; F16H 1/26; F16H 49/001; F16H 2049/003; F16H 55/0833;
(Continued)

(56) References Cited

U.S. PATENT DOCUMENTS 8,485,064 B2 * 7/2013 Kanai ................... F16H 49/001
74/640
9,797,497 B2 * 10/2017 Mizoguchi ............ F16H 49/001
(Continued)

FOREIGN PATENT DOCUMENTS

DE           834799 C    *   3/1952  ............ F16H 55/14
JP        60-232392       11/1985
(Continued)

OTHER PUBLICATIONS

English Translation of DE 834799 C (Wente Adolf) Mar. 24, 1952 [online] [retrieved on Aug. 17, 2017]. Retrieved from ProQuest Dialog. https://dialog.proquest.com/professional/docview/1135883134?accountid=161361 (Year: 1952).*
(Continued)

*Primary Examiner* — Victor L MacArthur
*Assistant Examiner* — Joseph Brown
(74) *Attorney, Agent, or Firm* — Buchanan Ingersoll & Rooney PC (57) ABSTRACT

A flat strain wave gearing (1) has a mechanism for preventing a flexible externally toothed gear (4) from moving in the direction of the device center axis (1*a*) with respect to a rigid internally toothed gears (2, 3). The mechanism has an inner-peripheral groove (11) formed on inner teeth (3*a*) of the internally toothed gear (3), an outer-peripheral groove (12) formed on outer teeth (4*a*) of the externally toothed gear (4), and a flexible ring (13) mounted between the inner-peripheral groove (11) and the outer-peripheral groove (12). The ring (13) is engageable with groove inner-peripheral surfaces (11*a*, 11*b*, 12*a*, 12*b*), from the direction of the device center axis (1*a*), at meshing positions of the both gears (2, 4).

7 Claims, 6 Drawing Sheets

(51) Int. Cl.
*F16H 55/16* (2006.01)
*F16H 55/18* (2006.01)
*F16H 55/14* (2006.01)
*F16B 21/18* (2006.01)

(52) U.S. Cl.
CPC ............. *F16H 55/14* (2013.01); *F16H 55/16* (2013.01); *F16H 55/18* (2013.01); *F16H 2049/003* (2013.01)

(58) Field of Classification Search
CPC .......... F16H 55/16; F16H 55/18; F16H 55/14; B25J 9/1025; F16B 21/18
USPC ............................. 74/409, 411, 640, 443, 461
See application file for complete search history.

(56) References Cited

U.S. PATENT DOCUMENTS

| | | | |
|---|---|---|---|
| 2007/0149346 | A1 | 6/2007 | Onishi et al. |
| 2009/0139357 | A1* | 6/2009 | Ishikawa ............ F16H 55/0833 74/461 |
| 2009/0139358 | A1* | 6/2009 | Ishikawa ............ F16H 55/0833 74/461 |
| 2015/0114174 | A1* | 4/2015 | Roopnarine .......... F16H 49/001 74/640 |
| 2016/0298746 | A1* | 10/2016 | Kiyono ................. F16H 49/001 |

FOREIGN PATENT DOCUMENTS

| | | |
|---|---|---|
| JP | 61-1757 U | 1/1986 |
| JP | 05-106623 A | 4/1993 |
| JP | 5-79089 U | 10/1993 |
| JP | 2007-177961 A | 7/2007 |
| JP | 2011-110976 A | 6/2011 |
| JP | 2013-177938 A | 9/2013 |

OTHER PUBLICATIONS

JP 05106623 A (Wolfgang Kuehnhold) Apr. 27, 1993. [online] [retrieved on Feb. 13, 2019]. Retrieved from: ProQuest Dialog. (Year: 1993).*

International Search Report (PCT/ISA/210) dated Aug. 25, 2015, by the Japanese Patent Office as the International Searching Authority for International Application No. PCT/JP2015/065630.

Written Opinion (PCT/ISA/237) dated Aug. 25, 2015, by the Japanese Patent Office as the International Searching Authority for International Application No. PCT/JP2015/065630.

* cited by examiner

PRIOR ART

FLAT STRAIN WAVE GEARING

TECHNICAL FIELD

The present invention relates to a flat strain wave gearing comprising two rigid gears and a cylindrical flexible gear for partially meshing with each of the rigid gears due to being radially flexed by a wave generator.

BACKGROUND ART

Flat strain wave gearings of this type are commonly known to comprise two rigid internally toothed gears and a cylindrical flexible externally toothed gear arranged inside the two internally toothed gears. During operation of the mechanism of a flat strain wave gearing, thrust is generated between the internally toothed gears and the externally toothed gear through the meshing thereof, and the externally toothed gear moves in the direction of the central axis of the device. Specifically, thrust is generated between the gears due to "walking" occurring during the meshing, which is characteristic of strain wave gearings, irrespective of whether a spur gear having a torsion angle of 0° is used.

Figure 6:
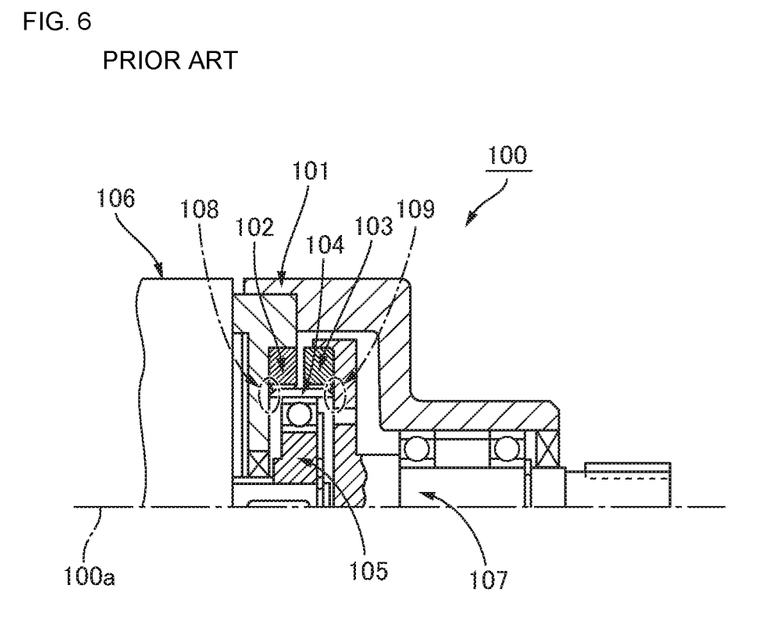
FIG. 6 is a schematic longitudinal cross-sectional view of a conventional flat strain wave gearing.

As shown in FIG. 6, in a common flat strain wave gearing 100, one internally toothed gear 102 is secured to a housing 101 so as not to rotate, and another internally toothed gear 103 is rotatably supported by the housing 101. The internally toothed gear 103 rotates integrally with an externally toothed gear 104. A wave generator 105 is rotationally driven by a motor 106, and rotation of the internally toothed gear 103 is outputted from an output shaft 107 secured coaxially to the internally toothed gear 103. Thrust is generated toward the fixed-side internally toothed gear 102 during a speed reducing operation, and is conversely generated toward the rotation-side internally toothed gear 103 during a speed increasing operation.

In order to restrict movement in the direction of the device center axis 100a caused by thrust, restraining parts 108, 109 (portions surrounded by chain lines in FIG. 6) for restricting such movement are provided on both sides of the externally toothed gear 104. The thrust acting on the externally toothed gear 104 is maximized when the externally toothed gear 104 moves in the direction of the device center axis 100a; this maximized value of the thrust is approximately three to four times as great as when the externally toothed gear 104 does not move due to abutting against the restraining part 108 or 109.

In the flat strain wave gearings described in patent documents 1 and 2, restricting members are arranged on both sides of the externally toothed gear so that the externally toothed gear does not move in the axial direction due to thrust.

PRIOR ART LITERATURE

Patent Documents

Patent Document 1: JP-A 2011-110976
Patent Document 2: JP-A 2013-177938

DISCLOSURE OF THE INVENTION

Problems to be Solved by the Invention

In a flat strain wave gearing, when restraining parts or restricting members are arranged on both sides of an externally toothed gear in order to restrict the movement thereof in the direction of the device center axis, the cost and size of the device increase in commensurate fashion. Additionally, when restraining parts or restricting members are arranged on both device-center-axis-direction sides of the externally toothed gear, the flow of lubricant across the meshing portion of the gears through both sides of the externally toothed gear might be impaired. As a result, the amount of wear on the meshing portion might increase due to insufficient lubrication, and other such adverse effects might occur.

With the foregoing in view, it is an object of the present invention to provide a flat strain wave gearing comprising a mechanism making it possible to restrict the movement of a flexible gear, without arranging restraining parts, restricting members, or other such members on both device-center-axis-direction sides of the flexible gear.

Means to Solve the Problems

According to the present invention, there is provided a flat strain wave gearing, characterized by having:
a first rigid gear;
a second rigid gear arranged coaxially with and adjacent to the first rigid gear;
a cylindrical flexible gear arranged coaxially with the outer periphery or the inner periphery of the first and second rigid gears;
a wave generator for causing the flexible gear to flex into a non-circular shape and partially mesh with the first and second rigid gears, and causing the meshing positions to move in the circumferential direction;
a first groove formed circumferentially on the teeth of the first rigid gear;
a second groove formed circumferentially on the teeth of the flexible gear so as to face the first groove; and
a radially flexible first ring arranged between the first and second grooves,
the first ring being capable of engaging with the groove inner-peripheral surfaces of each of the first and second grooves, from the direction along the device center axis, at the meshing positions between the first rigid gear and the flexible gear.

In the present invention, the mechanism for preventing the flexible gear from moving in the direction of the device center axis with respect to the first rigid gear is configured from the first groove formed in the teeth of the first rigid gear, the second groove formed in the teeth of the flexible gear, and the first ring.

When the flexible gear moves in the direction of the device center axis with respect to the first rigid gear, the second groove formed in the flexible-gear side moves in the same direction with respect to the first groove formed in the first-rigid-gear side. The first ring, which is mounted on the first and second grooves, engages with the groove inner-peripheral surface of the first groove on one side in the direction of the device center axis, and with the groove inner-peripheral surface of the second groove on the other side in the direction of the device center axis, at the meshing positions between the gears. Accordingly, the first ring functions as a member for restricting the movement of the flexible gear. The movement of the flexible gear with respect to the first rigid gear is thereby restricted, without arranging members for restricting such movement on both sides of the flexible gear.

In a common flat strain wave gearing, the number of teeth of the first rigid gear is the same as the number of teeth of the flexible gear, and the number of teeth of the second rigid gear is greater than the number of teeth of the first rigid gear; the second rigid gear is secured to a device housing or the like so as not to rotate.

In this case, when the wave generator rotates, the flexible gear undergoes relative rotation in accordance with the difference in the number of teeth with respect to the second rigid gear, and the first rigid gear rotates integrally with the flexible gear. The first ring, mounted between these gears, also rotates substantially integrally with the gears. Accordingly, it is possible to restrict the movement of the flexible gear while minimizing the occurrence of reduced performance and other adverse effects in the strain wave gearing.

In the present invention, the first groove is preferably formed at a position that is set apart, by at least half the tooth width of the first rigid gear, from the end on the second-rigid-gear side of the first rigid gear along the direction of the device center axis.

The first and second grooves are arranged at positions in the meshing regions between the flexible gear and the first and second rigid gears that are set apart from the center toward the outside in the tooth-width direction. This makes it possible to minimize any adverse effects caused by the provision of the first and second grooves, such as an increase in tooth surface stress, which is caused by the meshing of the gears.

Half the difference between the outside diameter and the inside diameter of the first ring may be set to a value equal to or less than the tooth depth of the flexible gear.

It is possible to arrange a ring between the second rigid gear and the flexible gear as well. In this case, the flat strain wave gearing of the present invention is provided with a third groove formed circumferentially on the teeth of the second rigid gear, a fourth groove formed circumferentially on the teeth of the flexible gear so as to face the third groove, and a flexible second ring arranged between the third and fourth grooves, in addition to the configuration described above. The second ring is arranged so as to be capable of engaging with the groove inner-peripheral surface of each of the third and fourth grooves, from the direction along the device center axis, at the meshing positions between the second rigid gear and the flexible gear.

In this case, similarly to the above case, the third groove is preferably formed at a position that is set apart, by at least half the tooth width of the second rigid gear, from the end on the first-rigid-gear side of the second rigid gear along the direction of the device center axis.

Additionally, half the difference between the outside diameter and the inside diameter of the second ring is preferably set to a value equal to or less than the tooth depth of the flexible gear.

In a typical flat strain wave gearing to which the present invention is applied, the first rigid gear is a first internally toothed gear, the second rigid gear is a second internally toothed gear, and the flexible gear is an externally toothed gear. The wave generator causes the externally toothed gear to flex into an ellipsoidal shape and mesh with the first and second internally toothed gears at both major-axis ends of the ellipsoid. The number of teeth of the first internally toothed gear is the same as the number of teeth of the externally toothed gear, and the number of teeth of the second internally toothed gear is 2n greater than the number of teeth of the first internally toothed gear, where n is a positive integer. The second internally toothed gear is secured so as not to rotate; for each rotation of the wave generator, the externally toothed gear undergoes relative rotation in accordance with the difference in the number of teeth with respect to the second internally toothed gear, and the first internally toothed gear rotates integrally with the externally toothed gear.

In this case, similarly to the above case, the first groove is preferably formed at a position that is set apart, by at least half the tooth width of the first internally toothed gear, from the end on the second-internally-toothed-gear side of the first internally toothed gear along the direction of the device center axis.

The inside diameter of the first ring is preferably equal to the core diameter of the second groove formed in the externally toothed gear so that the first ring is flexed into an ellipsoidal shape integrally with the externally toothed gear.

Providing the second groove reduces the root rim wall thickness of the flexible gear; the core diameter of the second groove is preferably greater than the root circle diameter of the externally toothed gear so as to avoid any decrease in root fatigue strength.

Furthermore, the core diameter of the first groove formed in the first internally toothed gear is preferably greater than the outside diameter at the major-axis positions of the first ring that has been flexed into an ellipsoidal shape, so that the outer-peripheral surface portion of the first ring that has been flexed into an ellipsoidal shape does not interfere with the first internally toothed gear at the two major-axis ends of the ellipsoid, which constitute the meshing positions of the gears.

In this case, half the difference between the outside diameter and the inside diameter of the first ring is preferably set to a value equal to or less than the tooth depth of the first internally toothed gear or the externally toothed gear.

Preferably, the first ring is highly rigid in the center-axis direction and readily flexible in the radial direction, and is readily capable of radially contracting and expanding over its entirety. A ring comprising a diagonal-winding coil spring can be used as a first ring comprising such characteristics. It is also possible to use a ring configured by winding a plate spring into a spiral, a ring comprising a garter spring, a bellows-shaped ring configured by curving a plate spring into a bellows shape, or the like.

BRIEF DESCRIPTION OF THE DRAWINGS

FIG. 1(a) is a longitudinal cross-sectional view of a flat strain wave gearing to which the present invention is applied, and 1(b) is a front view of the same;

FIG. 2(a) is a partial expanded longitudinal cross-sectional view of an expanded portion of the flat strain wave gearing of FIG. 1, and 2(b) is a schematic view of a ring mounting portion;

FIG. 3(a) is a schematic view of the ring mounting portion, and 3(b) is a schematic view of the cross-sectional shape of first and second grooves;

FIG. 4(a) and 4(b) are schematic views of characteristics required for the ring, and 4(c) and 4(d) are schematic views of rings;

FIG. 5(a) is a half longitudinal cross-sectional view of another example of a flat strain wave gearing to which the present invention can be applied, and 5(b) is a half front view of the same.

MODE FOR CARRYING OUT THE INVENTION

Embodiments of a flat strain wave gearing to which the present invention is applied are described below with reference to the drawings, FIG. 1(a) is a longitudinal cross-sectional view of a flat strain wave gearing according to the present embodiment, and FIG. 1(b) is a front view of the same. A flat strain wave gearing 1 comprises: a fixed-side internally toothed gear 2 and an output-side (rotation-side) internally toothed gear 3, which are rigid gears; a cylindrical externally toothed gear 4, which is a flexible gear; and a wave generator 5.

The internally toothed gears 2, 3 are disposed coaxially with a slight gap interposed therebetween in the direction of a device center axis 1a. The externally toothed gear 4 is arranged coaxially with the inner side of the internally toothed gears 2, 3. The teeth of the externally toothed gear 4 are of such width as to encompass the internally toothed gears 2, 3. External teeth 4a of the externally toothed gear 4 are configured such that portions on one tooth-width-direction side face internal teeth 2a of the internally toothed gear 2, and portions on the other tooth-width-direction side face internal teeth 3a of the internally toothed gear 3.

The wave generator 5 causes the externally toothed gear 4 to flex into a non-cylindrical shape; i.e., in the present example, an ellipsoidal shape, and mesh with the internally toothed gears 2, 3 at positions on the major axis L of the ellipsoid. When the wave generator 5 rotates, the meshing positions between the externally toothed gear 4 and the internally toothed gears 2, 3 move in the circumferential direction.

For example, the number of teeth of the output-side internally toothed gear 3 may be 2n less than the number of teeth of the fixed-side internally toothed gear 2 (where n is a positive integer). The internally toothed gear 3 and the externally toothed gear 4 have the same number of teeth. While the wave generator 5 rotates once, the externally toothed gear 4 undergoes relative rotation by an angle corresponding to the difference in the number of teeth with respect to the fixed-side internally toothed gear 2. The output-side internally toothed gear 3 rotates integrally with the externally toothed gear 4. The rotation of the internally toothed gear 3 is outputted to a load member (not shown).

FIG. 2(a) is a partial expanded longitudinal cross-sectional view showing a portion of the flat strain wave gearing 1 in an expanded manner, and FIG. 2(b) is a schematic view showing a portion of FIG. 2(a) in a further expanded manner.

Figure 2:
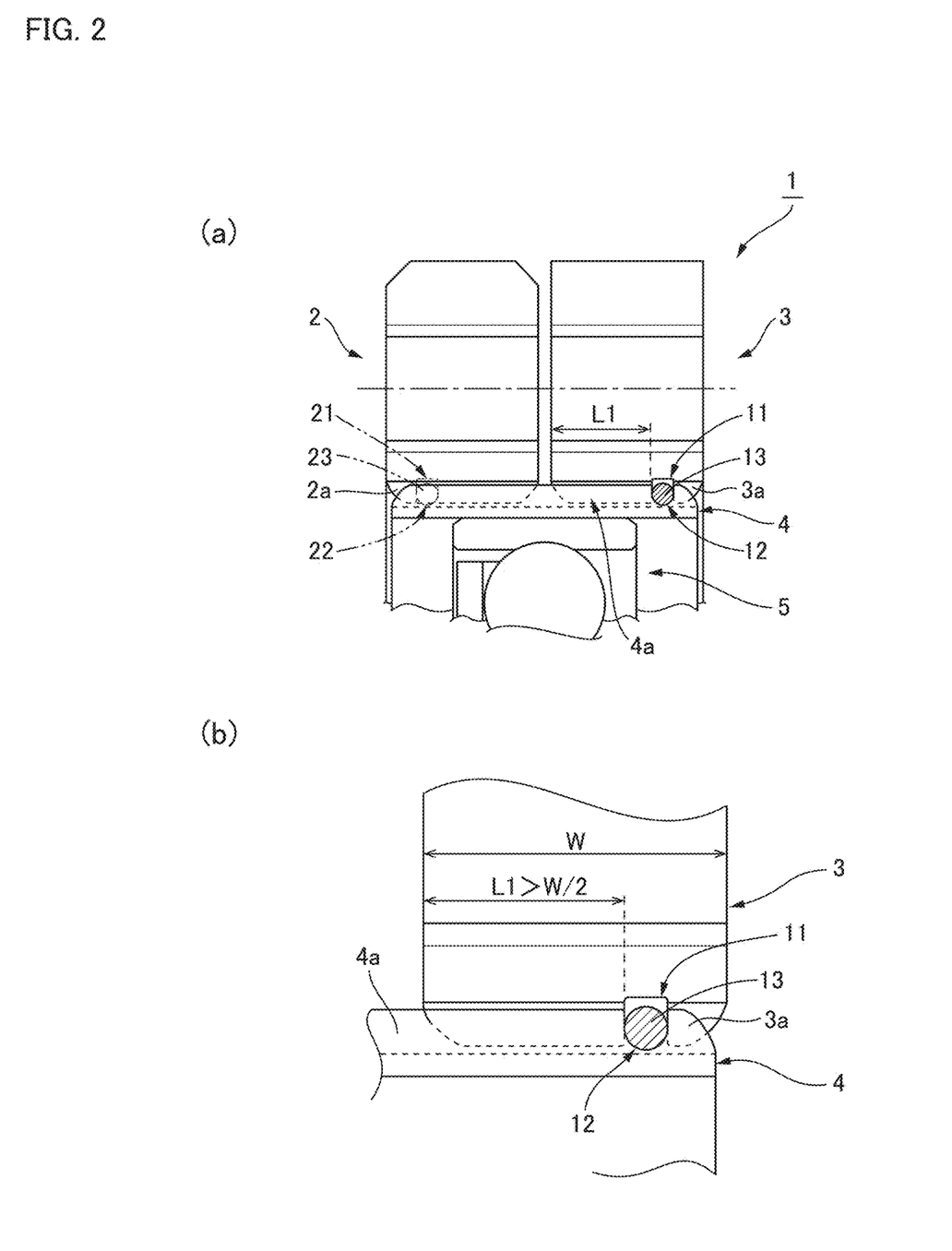
Figure 3:
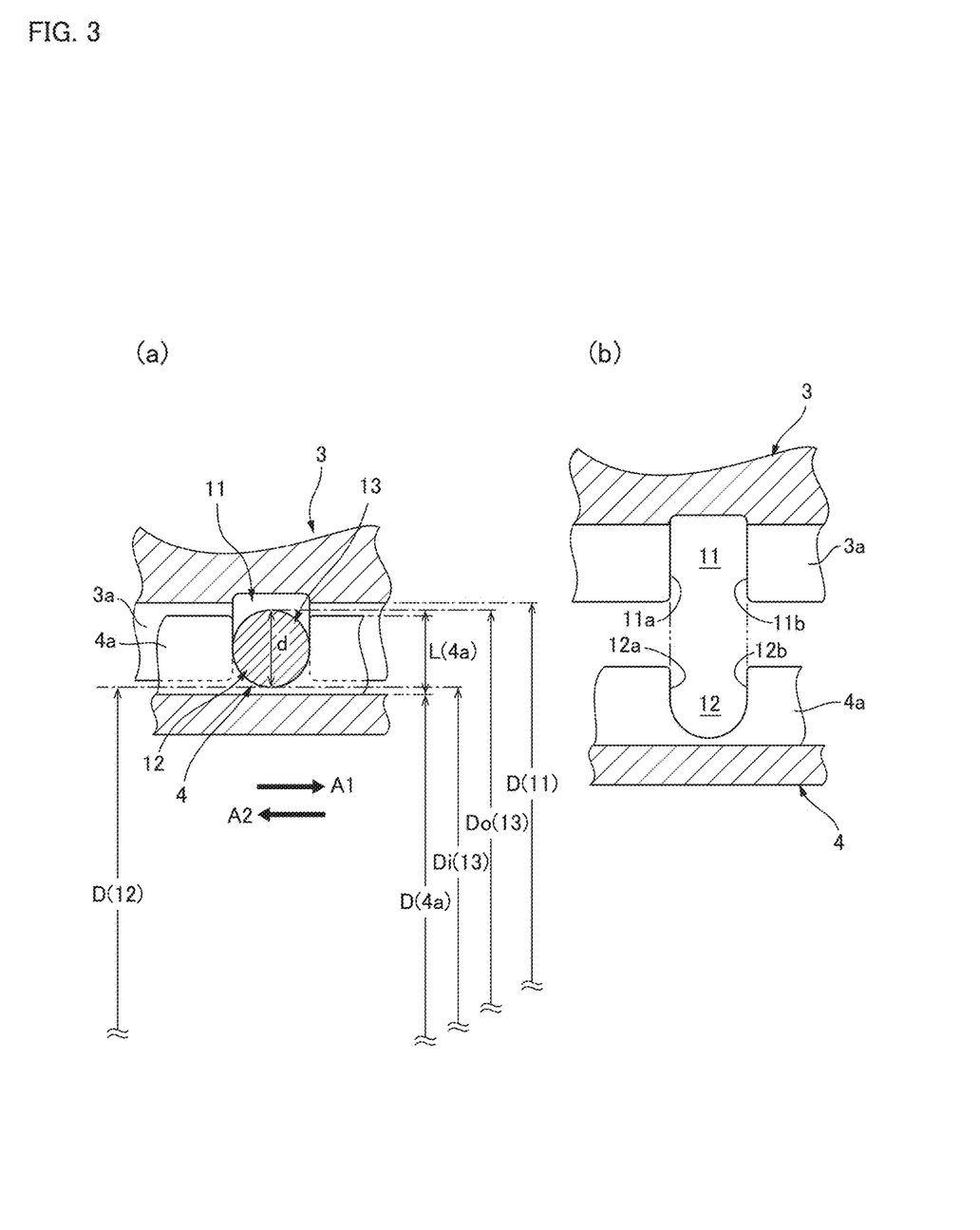

As shown in these drawings, an inner-peripheral groove 11 (first groove) that opens toward the inside is formed in a portion of the internal teeth 3a of the output-side internally toothed gear 3. The inner-peripheral groove 11 is formed on the internal teeth 3a throughout the inner periphery thereof, in a direction orthogonal to the tooth-width direction. An outer-peripheral groove 12 (second groove) that opens toward the outside is similarly formed on the external teeth 4a throughout the outer periphery of the externally toothed gear 4, in such a portion as to face the inner-peripheral groove 11. A radially flexible ring 13 is mounted between the inner-peripheral groove 11 and the outer-peripheral groove 12. The ring 13 is of circular cross-section, FIG. 3(a) is a schematic view of the inner-peripheral groove 11, the outer-peripheral groove 12, and the ring 13, and FIG. 3(b) is a schematic view of the cross-sectional shape of inner-peripheral groove 11 and the outer-peripheral groove 12. The inner-peripheral groove 11, the outer-peripheral groove 12, and the ring 13 are described in further detail with reference to FIGS. 2 and 3.

The cross-sectional shape and core diameter of the inner-peripheral groove 11 and outer-peripheral groove 12, as well as the size and cross-sectional shape of the ring 13, are appropriately set as described below. At the meshing positions between the internally toothed gear 3 and the externally toothed gear 4; i.e., the major-axis positions, the ring 13 is capable of engaging with each of the left and right groove inner-peripheral-side surfaces 11a, 11b, 12a, 12b of the inner-peripheral groove 11 and the outer-peripheral groove 12 from the direction along the device center axis 1a.

Figure 1:
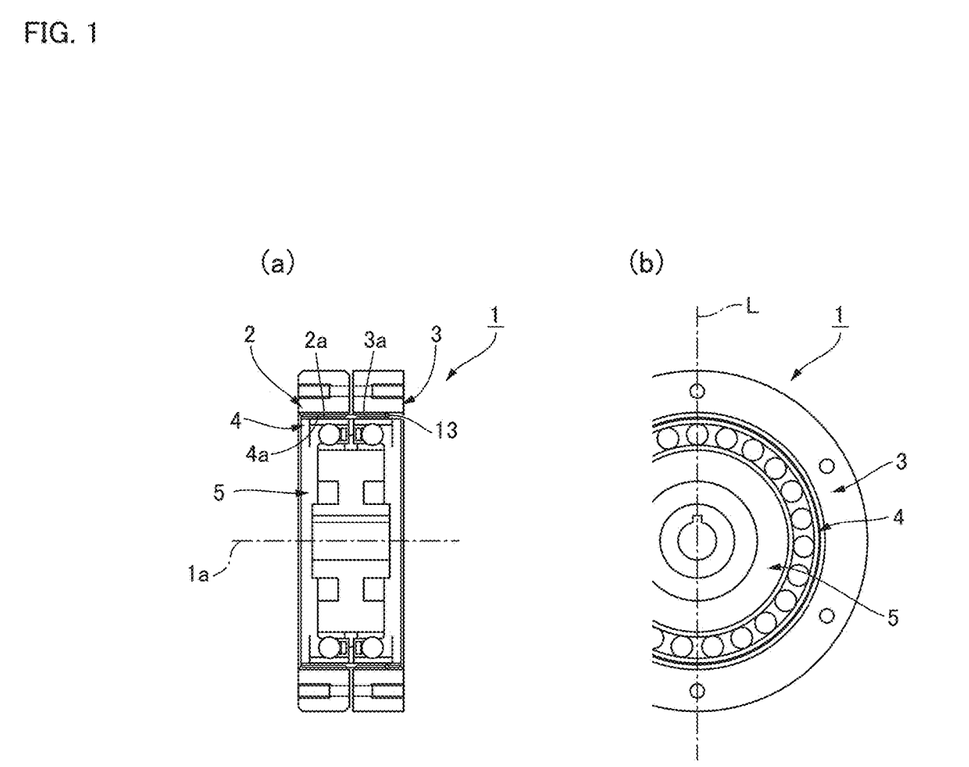

In the present example, the inner-peripheral groove 11 is of rectangular cross-section, and the groove width thereof is equal to or slightly greater than the diameter d of the ring 13. Additionally, the inner-peripheral groove 11 is formed at a position that is set apart, by a distance L1 that is at least half the tooth width W of the internally toothed gear 3, from the end on the other internally-toothed-gear 2 side of the internally toothed gear 3 along the direction of the device center axis 1a (see FIG. 1). For example, the inner-peripheral groove 11 may be formed at a position set apart by approximately ⅔ of the tooth width W. At positions that are further outward in the tooth-width direction than is the center, the effect of tooth surface stress caused by meshing of the gears 3, 4 is reduced. Accordingly, it is possible to minimize any substantial increase in the tooth surface stress of the gears 3, 4, as well as other adverse effects, due to the formation of the inner-peripheral groove 11 and the outer-peripheral groove 12.

The inside diameter Di(13) of the ring 13 is substantially equal to the core diameter D(12) of the outer-peripheral groove 12 formed in the externally toothed gear 4 so that the ring 13 is flexed into an ellipsoidal shape integrally with the externally toothed gear 4. The diameter d of the circular contour of the ring 13; i.e., half the difference between the outside diameter Do(13) and the inside diameter Di(13) of the ring 13, is set so as to be equal to or slightly less than the tooth depth L(4a) of the externally toothed gear 4.

The outer-peripheral groove 12 in the externally-toothed-gear 4 side is of substantially semicircular cross-section, the groove width of the open end of the outer-peripheral groove 12 being, equal to or slightly greater than the diameter d of the ring 13. Forming a semicircular groove lessens stress concentration and makes it possible to minimize any decrease in root fatigue strength. Additionally, the core diameter D(12) of the outer-peripheral groove 12 is set so as to be slightly greater than the root circle diameter D(4a) of the externally toothed gear 4. An outer-peripheral groove 12 of arcuate cross-section makes it possible to lessen stress, concentration accompanying sectional deficit, and minimize any decrease in root fatigue strength.

The core diameter D(11) of the inner-peripheral groove 11 on the internally-toothed-gear 3 side is set so as to be greater than the outside diameter at the major-axis positions of the flexible ring that has been flexed into an ellipsoidal shape. This prevents the outer-peripheral surface portion of the ring 13 that has been flexed into an ellipsoidal shape from interfering with the internally toothed gear 3 at the meshing positions (the two major-axis ends) of the gears 3, 4.

Figure 4:
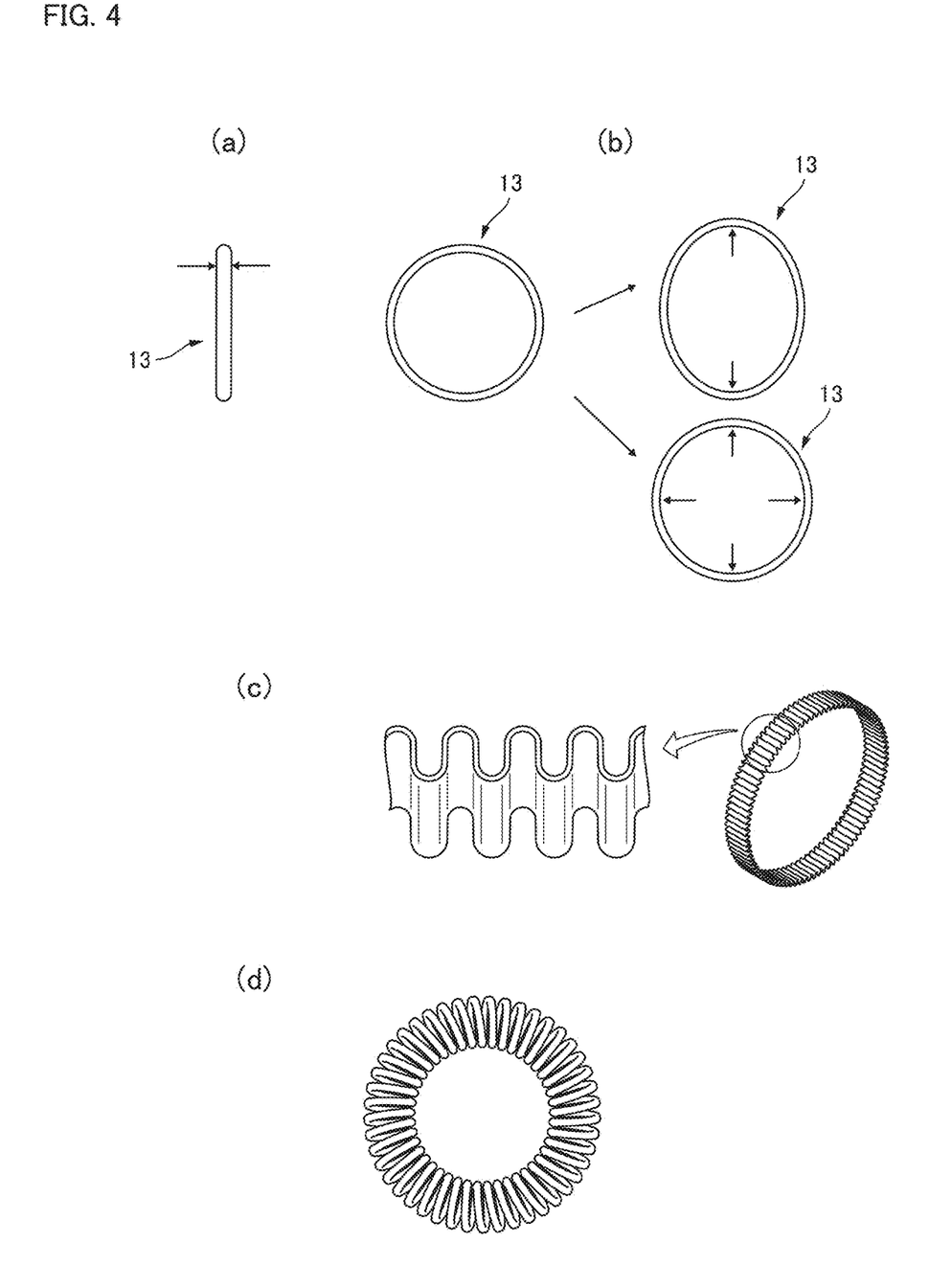

FIGS. 4(a) and 4(b) are schematic views of characteristics required for the ring 13. As shown in FIG. 4(a), the ring 13 must be highly rigid in the axial direction. This makes it possible to reliably restrict the movement of the externally toothed gear 4.

Additionally, as shown in FIG. 4(b), the ring 13 must be flexible in the radial direction, and must assume an ellipsoidal shape along the floor of the outer-peripheral groove 12 while being mounted therein. Furthermore, the ring, 13 must be capable of contracting so as to readily and uniformly assume a small diameter due to force applied radially inward from the outer-peripheral side, and expanding so as to readily and uniformly assume a large diameter due to force applied radially outward from the inner-peripheral side, over its entirety. This makes it possible for the ring 13 to be readily attached.

A ring configured by winding a plate spring into a spiral can be used as a ring 13 comprising such characteristics. It is also possible to use a garter spring formed into a ring by connecting two ends of a tightly wound coil spring. Furthermore, as shown in FIG. 4(c), it is also possible to use a bellows-shaped ring in which a plate spring having a fixed width is formed into a ring while being curved into a bellows shape. As shown in FIG. 4(d), it is preferable to use a ring configured from a diagonal-winding coil spring. It is possible to, use a ring of a type other than those described above, provided that the ring comprises the above-described characteristics.

The ring 13 can be attached between the inner-peripheral groove 11 in the internally toothed gear 3 and the outer-peripheral groove 12 in the externally toothed gear 4 using the following sequence. First, the ring 13 is caused to expand, and is mounted in the outer-peripheral groove 12 in the externally toothed gear 4 while the same is in a perfectly round state. The externally toothed gear 4, on which the ring 13 is mounted, is then mounted inside the internally toothed gears 2, 3.

In this case, the outside diameter of the ring 13 mounted on the externally toothed gear 4 and the addendum circle of the internally toothed gears 2, 3 may slightly overlap. Because the ring 13 comprises elastic properties so as to be capable of contracting radially inward, it is possible to elastically deform the ring 13 and then mount the externally toothed gear 4 inside the internally toothed gears 2, 3. When the externally toothed gear 4 is mounted inside the internally toothed gears 2, 3, the ring 13 assumes a state of being mounted between the outer-peripheral groove 12 of the externally toothed gear 4 and the inner-peripheral groove 11 of the internally toothed gear 3.

The wave generator 5 is then mounted on the inner-peripheral surface of the externally toothed gear 4. This causes the externally toothed gear 4 to flex into an ellipsoidal shape, and to mesh with the internally toothed gears 2, 3 at both major-axis positions of the ellipsoid. As shown in FIGS. 2 and 3, the ring 13 is configured so as to be capable of engaging with the groove inner-peripheral-side surfaces 11a, 11b, 12a, 12b of the inner-peripheral groove 11 and the outer-peripheral groove 12, from the direction along the device center axis 1a, at the meshing positions between the externally toothed gear 4 and the internally toothed gear 3.

During operation of the flat strain wave gearing 1 configured as described above, movement of the externally toothed gear 4 in the direction of the device center axis 1a, caused by the thrust generated by the meshing between the externally toothed gear 4 and the internally toothed gears 2, 3, is restricted due to the engagement between the ring 13 and the groove inner-peripheral-side surfaces 11a, 11b, 12a, 12b.

For example, as shown in FIG. 3(a), when the externally toothed gear 4 would move in the direction of arrow A1, the groove inner-peripheral-side surface 11b of the inner-peripheral groove 11 and the groove inner-peripheral-side surface 12a of the outer-peripheral groove 12 approach relatively close to the ring 13, and the ring 13 is pressed from both sides. The internally toothed gear 3 is rotatably supported, but movement in the direction of the device center axis 1a is constrained.

Therefore, the externally toothed gear 4 engages with the internally-toothed-gear 3 side with the groove inner-peripheral-side surface 12a of the outer-peripheral groove 12, the ring 13, and the groove inner-peripheral-side surface 11b of the inner-peripheral groove 11 interposed therebetween, and movement of the externally toothed gear 4 in the direction of arrow A1 is restricted. Movement of the externally toothed gear 4 in the opposite direction (in the direction of arrow A2) is similarly restricted.

It is not necessary to arrange restricting members on both device center axis 1a-direction sides of the externally toothed gear 4 in order to restrict movement thereof. Accordingly, it is possible to maintain a supply channel for supplying lubricant to the meshing positions between the externally toothed gear 4 and the internally toothed gears 2, 3 through both sides of the externally toothed gear 4. As shown in FIG. 6, when restraining parts which constitute restricting members are arranged on both sides of the externally toothed gear, wear readily occurs due to insufficient lubrication on the meshing parts; however, in the present example, such wear can be prevented.

(Modification)

In the flat strain wave gearing 1 described above, a mechanism (inner-peripheral groove 11, outer-peripheral groove 12, ring 13) for restricting the movement of the externally toothed gear 4 is provided between the output-side internally toothed gear 3 and the externally toothed gear 4. A similar mechanism may be additionally provided between the other fixed-side internally toothed gear 2 and the externally toothed gear 4.

In this case, as shown by the imaginary lines in FIG. 2(a), an inner-peripheral groove 21 is formed circumferentially on the internal teeth 2a of the internally toothed gear 2. An outer-peripheral groove 22 is formed circumferentially on the externally toothed gear 4 so as to face the inner-peripheral groove 21. A flexible ring 23 is mounted between the inner-peripheral groove 21 and the outer-peripheral groove 22.

In this case, similarly to the above case, the inner-peripheral groove 21 is preferably formed at a position that is set apart, by at least half the tooth width, from the end on the internally-toothed-gear 3 side. The dimensions of each of the inner-peripheral groove 21, the outer-peripheral groove 22, and the ring 23 are preferably set so as to satisfy the same relationships as in the case of the inner-peripheral groove 11, outer-peripheral groove 12, and ring 13 described above.

In this case, relative rotation is generated between the fixed-side internally toothed gear 2 and the externally toothed gear 4 in accordance with the difference in the number of teeth. The contact surface area between the inner-peripheral groove 21 of rectangular cross-section in the internally toothed gear 2 and the flexible ring 23 of circular cross-section is small (see FIG. 3). Therefore, there is little sliding frictional force generated between the internally toothed gear 2 and the ring 23.

(Other Embodiments)

Figure 5:
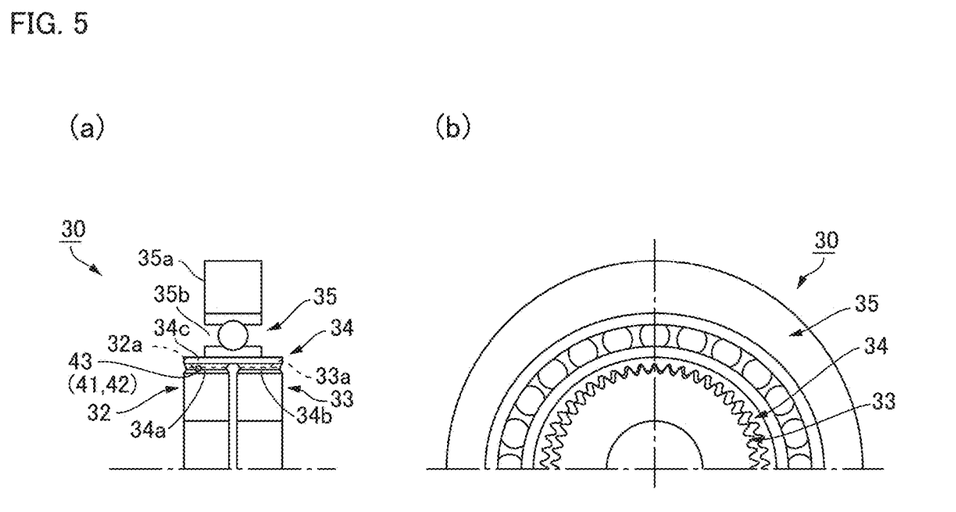

FIG. 5(a) is a half longitudinal cross-sectional view of an example of a flat strain wave gearing having a different configuration to which the present invention can be applied, and 5(b) is a half front view of the same. The flat strain wave gearing 30 shown in these drawings comprises: a first externally toothed gear 32 and a second externally toothed gear 33, which are rigid gears; a cylindrical internally toothed gear 34, which is a flexible gear that is arranged coaxially with the outer side of the externally toothed gears 32, 33; and a wave generator 35 fitted to the outer side of the internally toothed gear 34.

The internally toothed gear 34 comprises a radially flexible cylindrical barrel part 34c, and internal teeth 34a, 34b formed on the circular outer-peripheral surface of the cylindrical barrel part 34c. The internal teeth 34a, 34b are capable of meshing with external teeth 32a, 33a of the first and second externally toothed gears 32, 33.

The wave generator 35 is configured from: a rigid plug 35a of fixed thickness, the plug 35a comprising an ellipsoidal inner-peripheral surface; and a pair of wave generator bearings 35b mounted on the ellipsoidal inner-peripheral surface of the plug 35a. The wave generator bearings 35b are caused to, flex, over their entirety, into an ellipsoidal shape along the ellipsoidal inner-peripheral surface of the plug 35a. Accordingly, the internally toothed gear 34 is also caused to flex into an ellipsoidal shape along the ellipsoidal inner-peripheral surface of the plug 35a, and the internal teeth 34a, 34b are caused to mesh with each of the first and second external teeth 32a, 33a of the first and second externally toothed gears 32, 33 at the minor-axis positions [of the ellipsoid]. When the wave generator 35 rotates, each of the meshing positions between the internally toothed gear 34 and the first and second externally toothed gears 32, 33 move in the circumferential direction.

In a flat strain wave gearing 30 configured in this manner, it is possible to have an outer-peripheral groove 41, an inner-peripheral groove 42, and a ring 43 for restricting the movement of the internally toothed gear 34 be arranged between the first externally toothed gear 32 and the internally toothed gear 34. Similarly, it is possible to have an outer-peripheral groove, an inner-peripheral groove, and a ring for restricting the movement of the internally toothed gear 34 be arranged between the second externally toothed gear 33 and the internally toothed gear 34.

The invention claimed is:

1. A flat strain wave gearing, comprising:
a first rigid gear;
a second rigid gear arranged coaxially with and adjacent to the first rigid gear;
a cylindrical flexible gear arranged coaxially inside of or outside of the first and second rigid gears;
a wave generator for causing the flexible gear to flex into a non-circular shape and partially mesh with the first and second rigid gears, and causing meshing positions to move in a circumferential direction;
a first groove formed on teeth of the first rigid gear throughout a periphery thereof;
a second groove formed on teeth of the flexible gear throughout a periphery thereof so as to face the first groove; and
a radially flexible first ring arranged between the first and second grooves,
the first ring being configured to engage with first and second groove inner-peripheral surfaces of the first and second grooves, from a direction along a device center axis, at the meshing positions between the first rigid gear and the flexible gear,
wherein the first groove inner-peripheral surface of the first groove has a first groove side surface and a second groove side surface facing each other,
the second groove inner-peripheral surface of the second groove has a third groove side surface and a fourth groove side surface facing each other,
the first ring is positioned between the first groove side surface and the fourth groove side surface to restrict movement of the first rigid gear relative to the flexible gear in one direction along the device center axis, and
the first ring is positioned between the second groove side surface and the third groove side surface so as to restrict the movement of the first rigid gear relative to the flexible gear in an opposite direction along the device center axis,
the first rigid gear is a first internally toothed gear;
the second rigid gear is a second internally toothed gear;
the flexible gear is an externally toothed gear;
the wave generator causes the externally toothed gear to flex into an ellipsoidal shape and mesh with the first and second internally toothed gears at both major-axis ends of the ellipsoidal shape;
a number of teeth of the first internally toothed gear is the same as a number of teeth of the externally toothed gear;
a number of teeth of the second internally toothed gear is 2n greater than the number of teeth of the first internally toothed gear, where n is a positive integer;
the second internally toothed gear is secured so as not to rotate; and
for each rotation of the wave generator, the externally toothed gear undergoes relative rotation in accordance with the difference in the number of teeth with respect to the second internally toothed gear, and the first internally toothed gear rotates integrally with the externally toothed gear,
an inside diameter of the first ring is equal to a core diameter of the second groove formed in the externally toothed gear;
the core diameter of the second groove is greater than a root circle diameter of the externally toothed gear before flexed into the ellipsoidal shape; and
a core diameter of the first groove formed in the first internally toothed gear is greater than a major axis of the first ring when flexed into the ellipsoidal shape.

2. The flat strain wave gearing according to claim 1, wherein
the first groove is formed at a position that is set apart, by at least half a tooth width of the first rigid gear, from an end of the first rigid gear on a second-rigid-gear side along the direction of the device center axis.

3. The flat strain wave gearing according to claim 1, wherein
half a difference between an outside diameter and an inside diameter of the first ring is set to a value equal to or less than a tooth depth of the flexible gear.

4. The flat strain wave gearing according to claim 1, further comprising:
a third groove formed on the teeth of the second rigid gear throughout the periphery thereof;
a fourth groove formed on the teeth of the flexible gear throughout the periphery thereof so as to face the third groove; and
a flexible second ring arranged between the third and fourth grooves,
the second ring being configured to engage with a groove inner-peripheral surface of each of the third and fourth grooves, from the direction along the device center axis, at meshing positions between the second rigid gear and the flexible gear.

5. The flat strain wave gearing according to claim 4, wherein
the third groove is formed at a position that is set apart, by at least half a tooth width of the second rigid gear, from an end of the second rigid gear on a first-rigid-gear side along the direction of the device center axis.

6. The flat strain wave gearing according to claim 4, wherein
half a difference between an outside diameter and an inside diameter of the second ring is set to a value equal to or less than a tooth depth of the flexible gear.

7. The flat strain wave gearing according to claim 1, wherein
the first ring is:
a ring configured by winding a plate spring into a spiral;
a ring comprising a garter spring;
a bellows-shaped ring configured by curving a plate spring into a bellows shape; or
a ring comprising a diagonal-winding coil spring.

* * * * *